(12) United States Patent
Brumfield

(10) Patent No.: US 6,619,699 B2
(45) Date of Patent: Sep. 16, 2003

(54) FLEXIBLE HYDRAULIC BRAKE LINE ASSEMBLY FOR MOTOR VEHICLE WHEELS

(75) Inventor: Merle T. Brumfield, Tipp City, OH (US)

(73) Assignee: Harco Industries, Inc., Brookville, OH (US)

( * ) Notice: Subject to any disclaimer, the term of this patent is extended or adjusted under 35 U.S.C. 154(b) by 0 days.

(21) Appl. No.: 09/829,175

(22) Filed: Apr. 9, 2001

(65) Prior Publication Data

US 2002/0092718 A1 Jul. 18, 2002

Related U.S. Application Data

(63) Continuation-in-part of application No. 09/760,355, filed on Jan. 12, 2001.

(51) Int. Cl.[7] ............................ F16L 33/00; F16L 47/00
(52) U.S. Cl. ................. 285/256; 285/334.5; 285/62
(58) Field of Search ................... 285/256, 334.5, 285/353, 331, 61, 62, 55

(56) References Cited

U.S. PATENT DOCUMENTS

| | | | |
|---|---|---|---|
| 3,433,505 A | * | 3/1969 | Weatherhead .......... 285/148.16 |
| 3,924,883 A | | 12/1975 | Frank |
| 4,548,430 A | * | 10/1985 | Haubert et al. ............ 285/256 |
| 4,626,006 A | | 12/1986 | Noguchi et al. |
| 4,813,517 A | | 3/1989 | Mann |
| 4,829,654 A | * | 5/1989 | Hangebrauck ................ 29/508 |
| 5,037,142 A | * | 8/1991 | Helping .................. 285/148.13 |
| 5,333,914 A | * | 8/1994 | Oomori et al. ............. 285/119 |
| 5,445,191 A | | 8/1995 | Green et al. |
| 5,526,848 A | * | 6/1996 | Terashima et al. .......... 138/125 |
| 5,797,629 A | * | 8/1998 | Beagle ........................ 285/256 |
| D450,280 S | * | 11/2001 | Brumfield .................. D12/180 |

* cited by examiner

Primary Examiner—Lynne H. Browne
Assistant Examiner—Aaron M Dunwoody
(74) Attorney, Agent, or Firm—Jacox, Meckstroth & Jenkins

(57) ABSTRACT

Hydraulic fluid is supplied to hydraulic brake cylinders for calipers and brake shoes of a motor vehicle through brake line assemblies each including a flexible multi-layer high pressure brake hose having opposite end portions each receiving an inwardly forged or swaged ribbed end portion of a small diameter high pressure steel tube. A metal collar receives each tube and is locked on the tube by a crimp or threads and/or a spring retaining washer or push nut and is crimped onto the end portion of the hose to form a direct tube-to-hose connection having high tensile strength. The opposite end portion of each metal tube is flared and receives an externally threaded tubular flare nut. The flare nut on one tube is threaded directly into a brake caliper, and the flare nut on the other tube is threaded into a brake control valve.

15 Claims, 6 Drawing Sheets

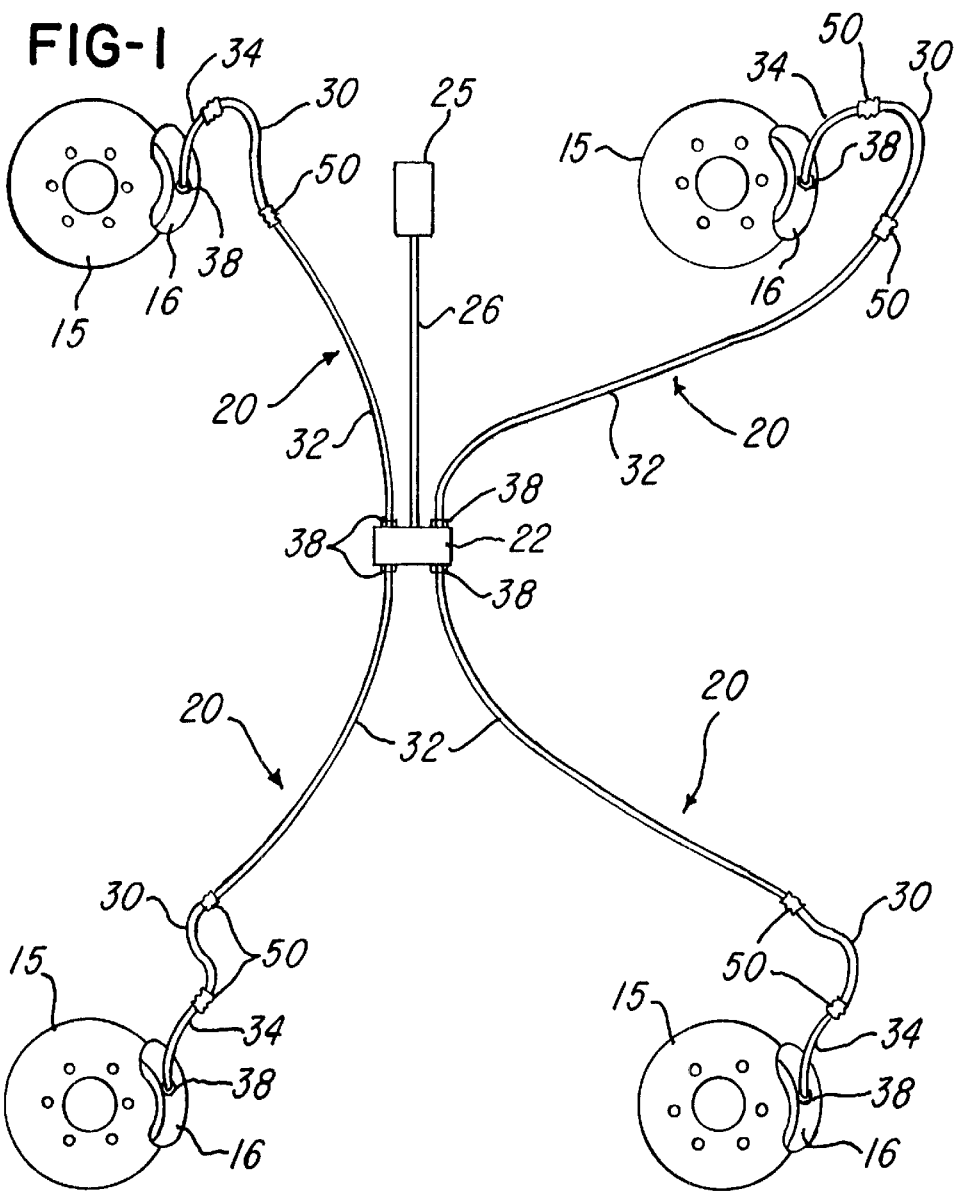
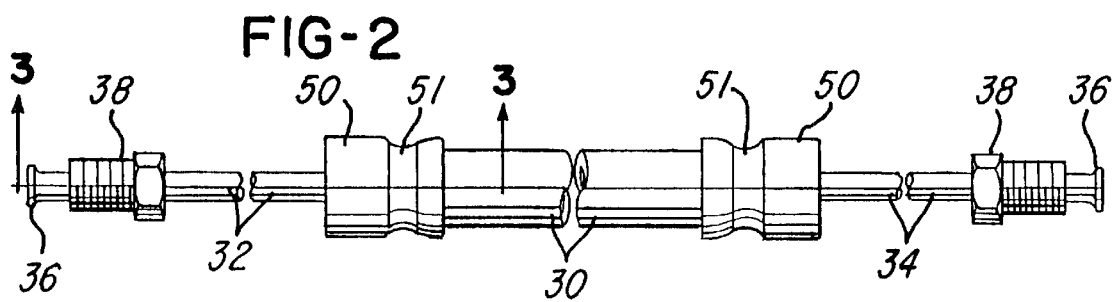

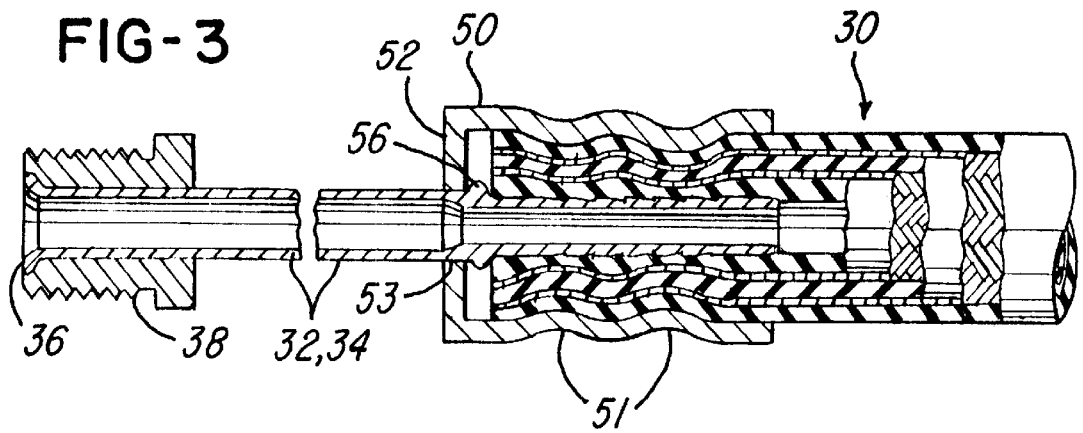
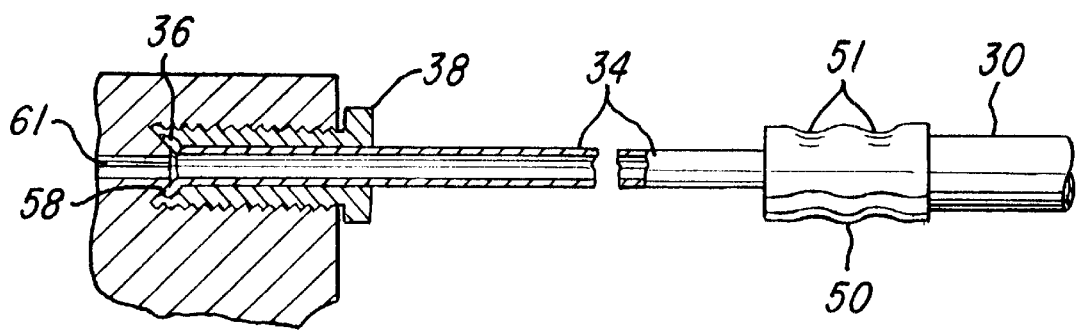
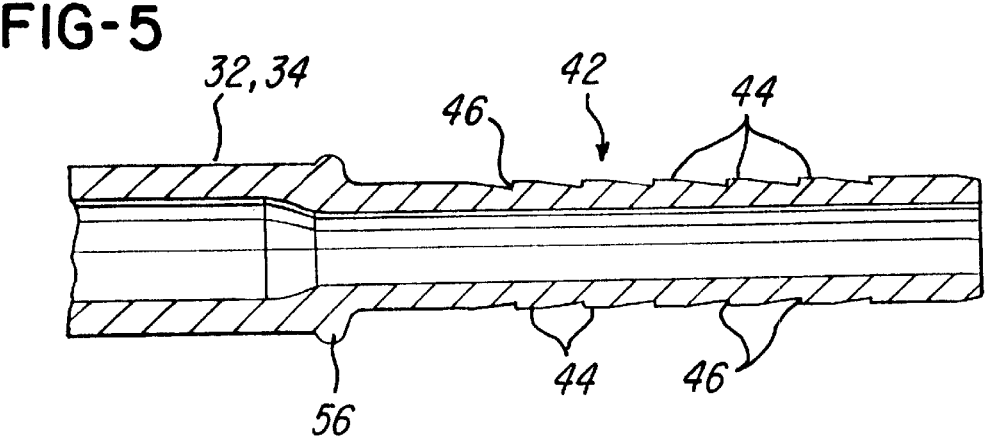

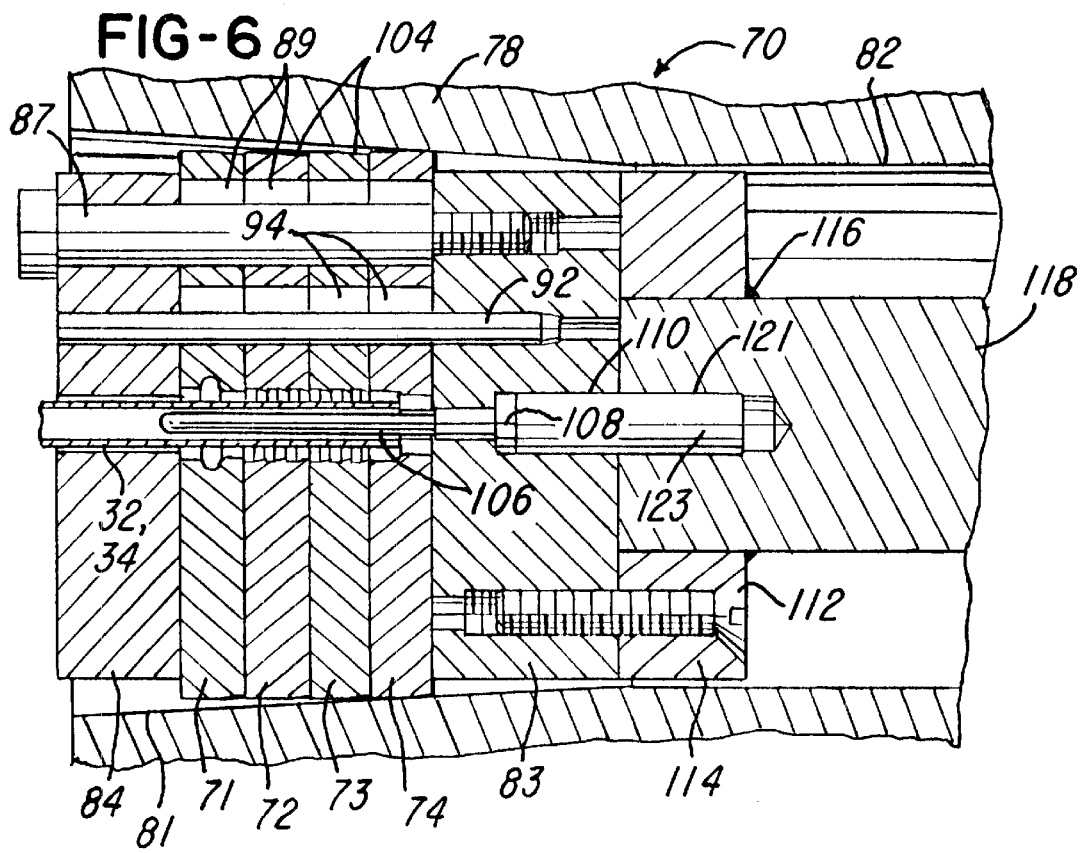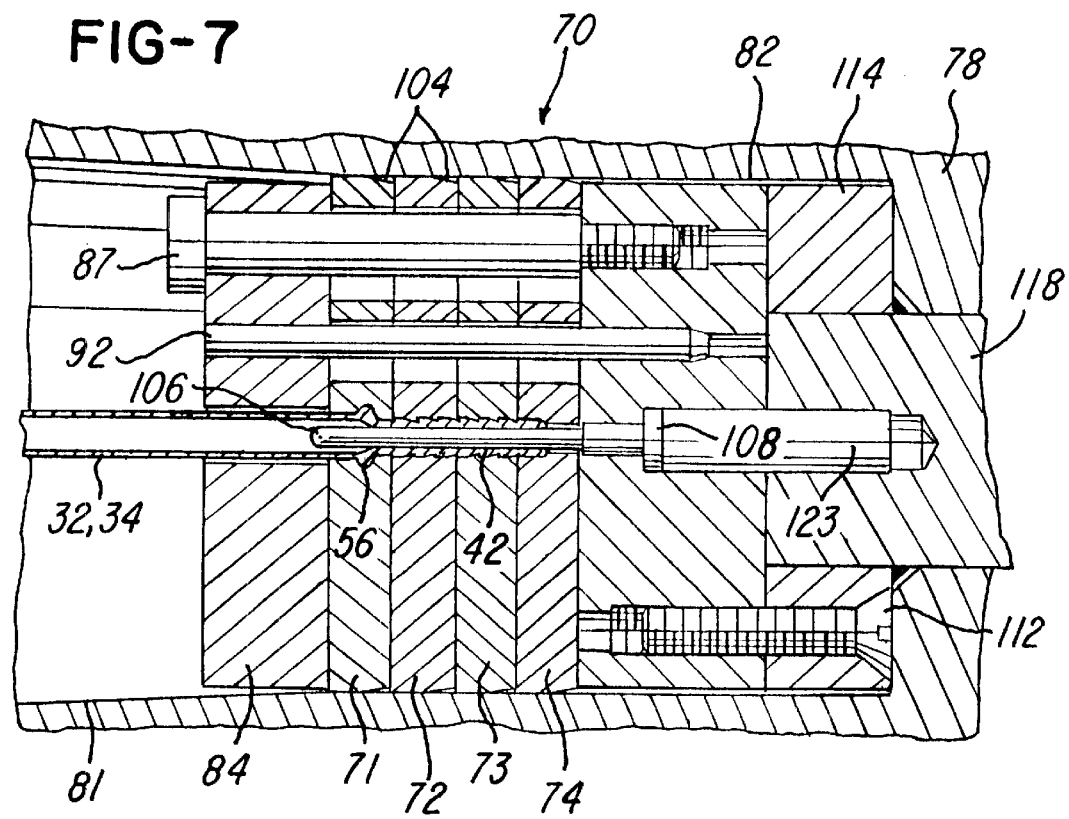

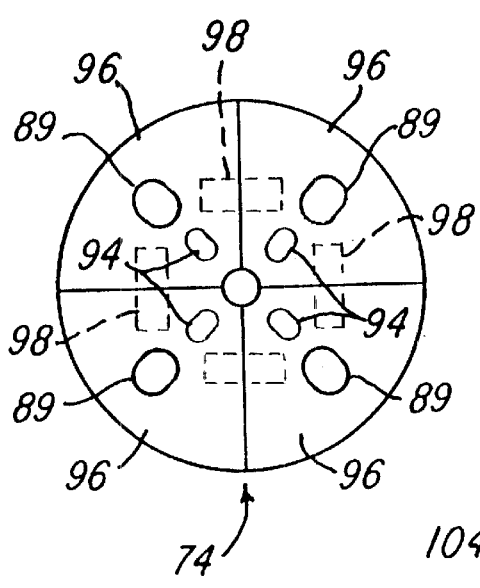
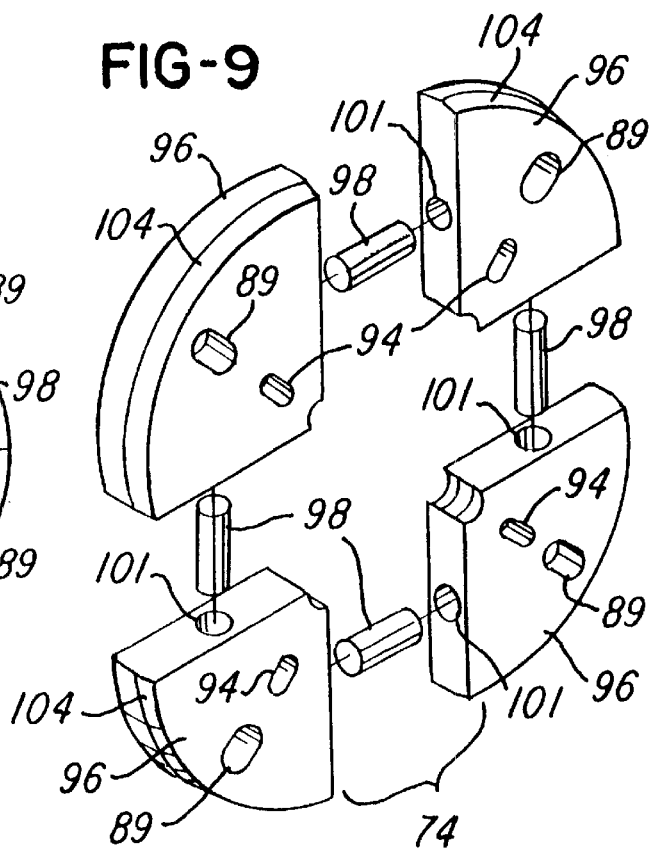
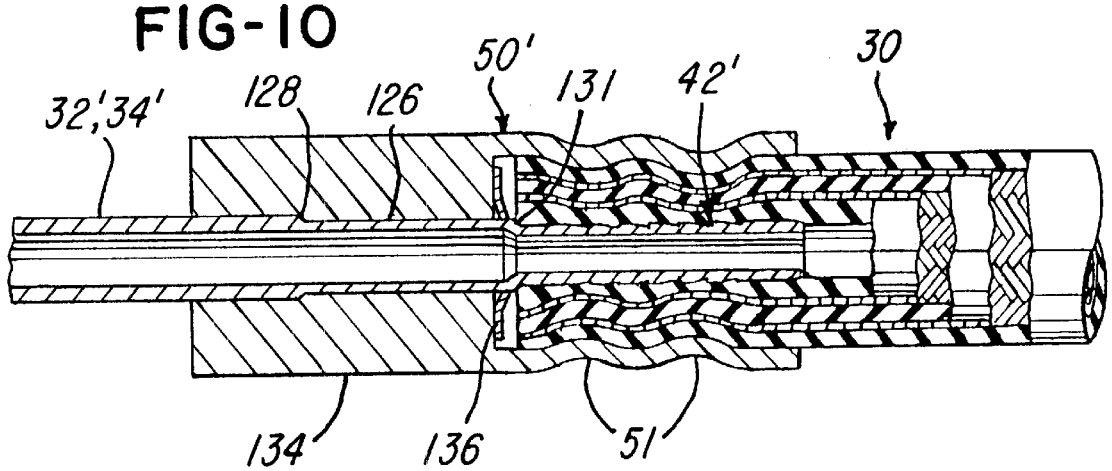

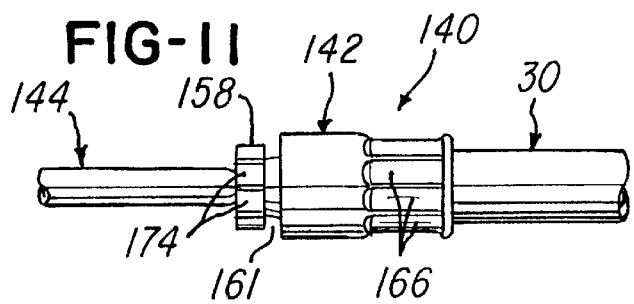
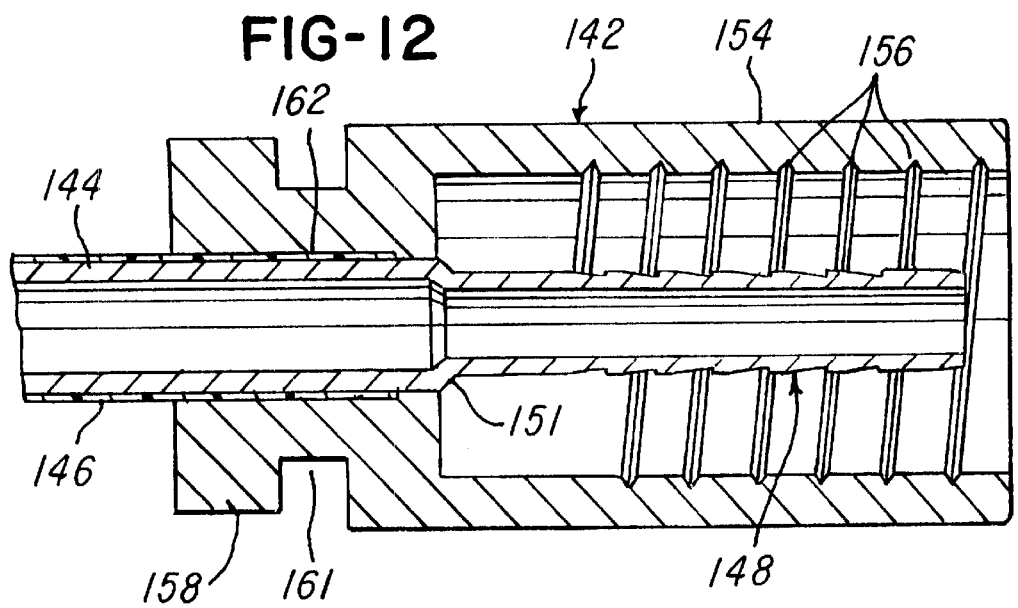
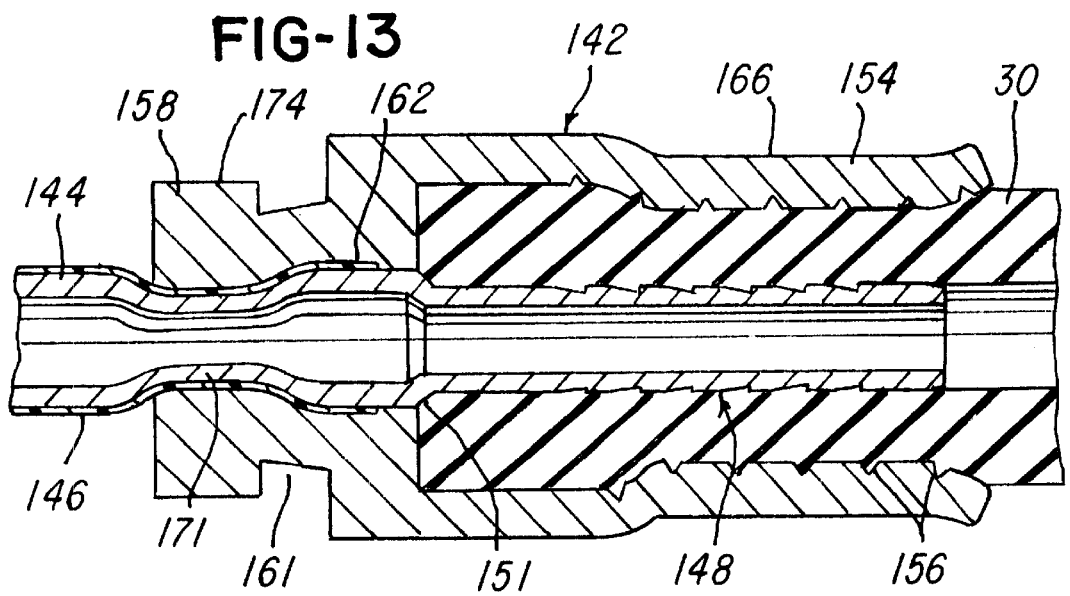

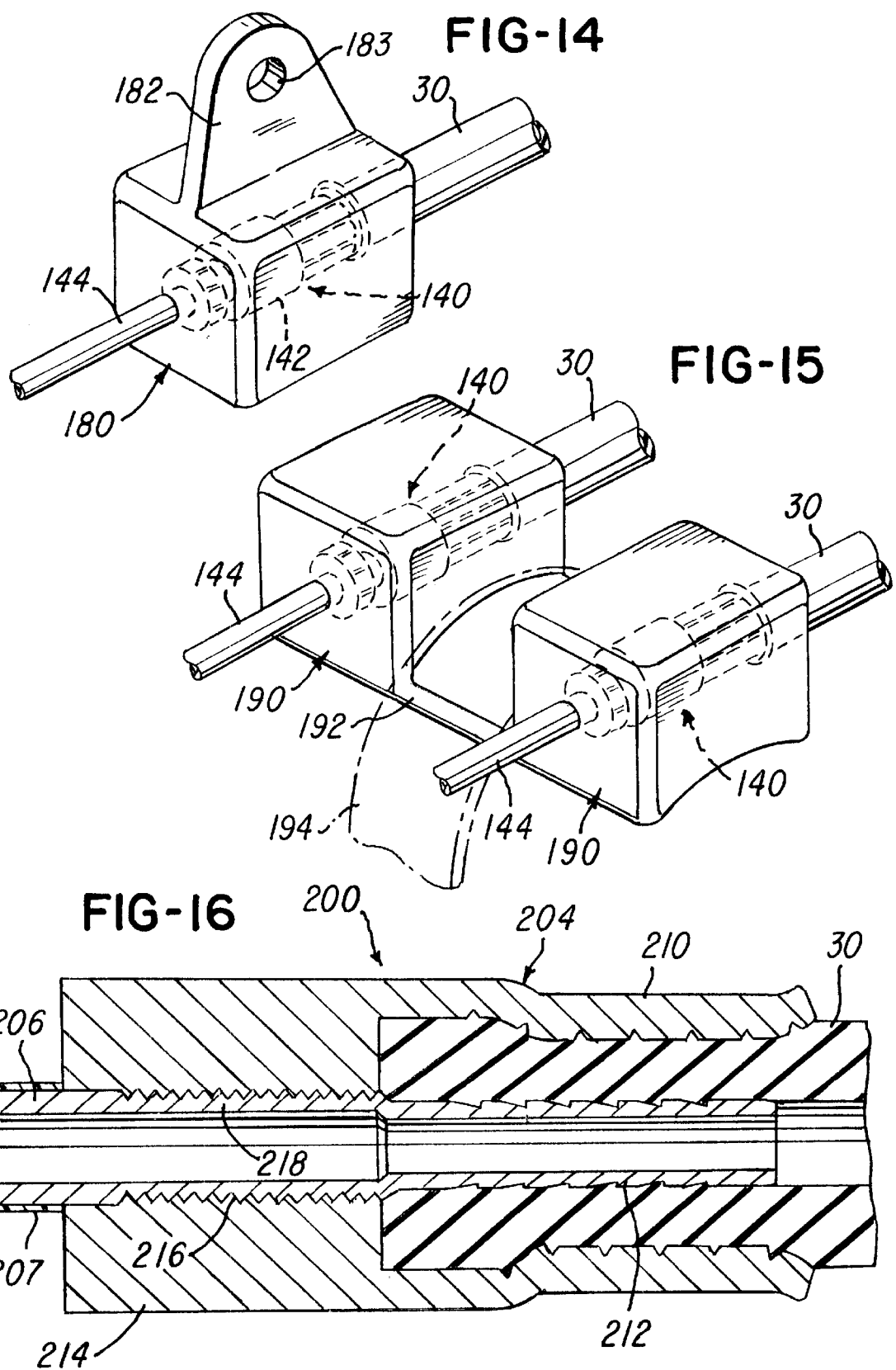

FLEXIBLE HYDRAULIC BRAKE LINE ASSEMBLY FOR MOTOR VEHICLE WHEELS

RELATED APPLICATION

This application is a continuation-in-part of application Ser. No. 09/760,355, filed Jan. 12, 2001.

BACKGROUND OF THE INVENTION

In the production of hydraulic brake line assemblies used on motor vehicles such as automobiles, it is common to use a multi-layer high pressure flexible hose of the type disclosed in U.S. Pat. No. 5,445,191. As generally illustrated in this patent, the hose includes an inner rubber tube, an outer rubber tube and an intermediate rubber tube with the inner rubber tube and the intermediate rubber tube each surrounded by braided reinforcing fibers. Such a flexible hose is commonly used in combination with bendable high pressure steel pipe or tubes having an outside diameter of about $3/16$" and an inside diameter of about $1/8$". Various types of special brass fittings are used to connect the flexible hose to the steel tubing and to connect the flexible hose to a caliper for a disk brake or to a hydraulic cylinder for a drum and shoe brake.

When a flexible high-pressure hose is connected to a brake caliper, it is common to use a fitting having a "banjo" head portion, for example, of the type disclosed in U.S. Pat. No. 4,626,006. Such a fitting is usually machined or fabricated from solid brass and includes a crimping collar or sleeve surrounding an end portion of the brake hose and a smaller concentric tubular nipple or eyelet which projects into the end portion of the tube. The brass eyelet has axially spaced circumferential ridges which grip the hose when the collar or sleeve is crimped inwardly against the end portion of the hose. The eyelet is sometimes formed as an integral part of the brass fitting, as shown in the '006 patent, or the eyelet may be a separate brass tube which is pressed into the collar or fitting and then brazed. The "banjo" head portion disclosed in the '006 patent comprises a block or eye-joint portion which has a cross bore for receiving a steel screw having internal fluid passages and threaded into the body of the caliper. The screw also extends through a pair of copper washers positioned on opposite sides of the fitting for forming high pressure seals between the fitting and the caliper. Frequently, the fitting has an internally threaded female fitting portion which is machined from brass along with the collar and eyelet.

A brass fitting with a collar and an integral or pressed-in nipple or eyelet and with a "banjo" head portion, such as disclosed in the '006 patent, is an expensive component for connecting the flexible brake hose to a brake caliper or cylinder, and adds significantly to the costs of the brake line assembly. When a bendable steel or brass tube is used to connect "banjo" head portion to a flexible rubber hose, one end portion of the tube is brazed to the head portion, and the opposite end portion of the tube is brazed to a brass fitting which has a collar and an internal eyelet that is also brazed to the fitting or machined as an integral part of the collar. Thus the various fittings which are commonly used to connect the opposite end portions of a high pressure hose to a bendable steel tube and to a hydraulic cylinder within a brake caliper or for brake shoes usually require a brazing operation followed by a plating operation which add significantly to the cost of the brake line assembly and result in additional possible leak paths for the hydraulic fluid. In addition, many of the brass fittings commonly used are internally threaded or female fittings which are more difficult to produce in high volume with precision internal surfaces. U.S. Pat. No. 4,813,517 discloses a modular manifold brake hose end fitting for reducing the number of fittings in a vehicle brake line system, and published PCT Application No. WO 99/49256 discloses a brake pipe or tube having a reduced end portion projecting into a flexible hose which is compressed against the end portion by crimping a metal collar. The collar is confined on the tube by outwardly projecting circumferential ribs formed within the tube by compressing the tube axially.

SUMMARY OF THE INVENTION

The present invention is directed to an improved and simplified flexible brake line assembly which provides significant features and advantages. For example, a brake line assembly of the invention significantly reduces the cost of an assembly by eliminating expensive brass fittings, eliminating brazing and plating operations, eliminating female threaded fittings and "banjo"-type fittings and simplifies the installation of the brake line assembly onto a motor vehicle. In addition, the brake line assembly of the invention minimizes potential leak paths, provides for convenient and rapid testing for high pressure leaks prior to shipment to a motor vehicle assembly plant, permits all of the brake line assemblies for a motor vehicle to be tied together to simplify handling, and further provides for installation of the assemblies to wheel brake calipers and other wheel brake cylinders and valves and manifolds with only one torque wrench.

In accordance with one embodiment of the invention, a hydraulic brake line assembly includes a section of high pressure flexible hose with concentric rubber-like tubes having surrounding or braided reinforcing fibers and with opposite end portions of the hose each receiving an inwardly forged and reduced end portion of a high pressure bendable steel tube. The end portion of each steel tube is forged or deformed to provide the axial cross sectional configuration and an outer diameter similar to a tubular nipple or eyelet. A metal sleeve or collar surrounds each end portion of the hose and the corresponding forged end portion of the steel tube and has a hole or bore for receiving the steel tube.

The collar is locked onto the tube by an inwardly tube deforming crimp or a threaded connection or by an outwardly projecting circumferential rib formed on the end portion of the tube when the reduced end portion of the tube is forged, and/or by a spring steel retaining washer on the tube. The metal collar is crimped to compress the end portion of the hose against the reduced and ribbed end portion of the tube and cooperates with the lock of the collar to the tube to form a connection or coupling between the tube and the hose having a substantial tensile strength over 400 pounds. The assembly of the collar and the connected end portions of the hose and tube may be encapsulated in an injected molded plastic body which is also molded with a mounting portion to facilitate attaching the assembly to a component of a motor vehicle.

The opposite end portion of the metal tube extending from each end portion of the flexible hose is formed with an outwardly projecting flare and receives an externally threaded or male flare nut. The flare nut may be threaded directly into a threaded port of a brake caliper or brake cylinder housing or valve body, and the port has a conical end surface for engaging the flared end of the metal tube. The metal tubes are bent to a predetermined configuration.

Other features and advantages of the invention will be apparent from the following description, the accompanying drawings and the appended claims.

BRIEF DESCRIPTION OF THE DRAWINGS

FIG. 1 is a diagrammatic view of a hydraulic brake system for a motor vehicle or automobile and incorporating a brake line assembly constructed in accordance with the present invention for each of the wheel brakes;

FIG. 2 is a side elevational view of a brake line assembly constructed in accordance with the invention and with portions of the flexible hose and metal tubes broken away to show that the length and curvature of hose and tubes may vary;

FIG. 3 is an enlarged fragmentary axial section taken generally on the line 3—3 of FIG. 2;

FIG. 4 is a fragmentary axial section illustrating the coupling of the brake line assembly to a brake caliper;

FIG. 5 is an enlarged fragmentary section of a deformed or forged end portion of a high pressure steel tube;

FIG. 6 is a fragmentary axial section of a die system or tooling for forging or reducing the end portion of a steel tube and before the end portion is reduced;

FIG. 7 is a section similar to FIG. 6 and illustrating the position of the die system after the end portion of the tube is reduced;

FIG. 8 is an end view of a typical die set shown in FIGS. 6 & 7;

FIG. 9 is an exploded perspective view of the die set shown in FIG. 8;

FIG. 10 is an enlarged fragmentary section similar to FIG. 3 and showing a modification of an assembly constructed in accordance with the invention;

FIG. 11 is a fragmentary elevational view similar to FIG. 2 and showing another embodiment or assembly constructed in accordance with the invention;

FIG. 12 is a fragmentary axial section of the assembly shown in FIG. 11 before receiving an end portion of a flexible hose;

FIG. 13 is a fragmentary axial section of the assembly, taken generally on the line 13—13 of FIG. 11;

FIG. 14 is a perspective view of the assembly shown in FIG. 11 and encapsulated in a molded plastic body with a mounting portion in accordance with the invention;

FIG. 15 is a perspective view similar to FIG. 14 and showing two of the assemblies of FIG. 11 encapsulated in a molded plastic body; and FIG. 16 is a fragmentary axial section similar to FIG. 13 and showing another embodiment or assembly constructed in accordance with the invention.

DESCRIPTION OF THE PREFERRED EMBODIMENTS

FIG. 1 illustrates a motor vehicle or automotive brake system including a brake disk 15 and a hydraulically actuated brake caliper 16 for each of the four wheels of the automobile. However, it is to be understood that any of the wheels may have a drum brake with brake shoes and a hydraulic cylinder or actuator (not shown) in place of a brake disk 15 and a caliper with a hydraulic cylinder or actuator 16. High pressure hydraulic fluid is supplied to each of the actuators or calipers 16 through a hydraulic brake line assembly 20 constructed in accordance with the invention. Each of the assemblies 20 extends from an automatic brake system (ABS) control valve 22 (FIG. 1) which is supplied with hydraulic fluid from a master brake cylinder 25 connected to the valve 22 by a high pressure steel tube or line 26.

In accordance with the present invention, each of the brake line assemblies 20 includes a high pressure flexible brake hose 30 which is constructed, for example, as disclosed in above mentioned U.S. Pat. No. 5,445,191, the disclosure of which is incorporated by reference. A high pressure and bendable steel tube 32 connects one end portion of each flexible hose 30 to the control valve 22, and a high pressure bendable steel tube 34 connects the opposite end portion of each flexible hose 30 to the corresponding brake actuator or caliper 16. Each of the bendable steel tubes 32 and 34 has a conventional outside diameter of 3/16" and an inside diameter of 1/8" and may be formed from stainless steel seamless tubing. The outer end portion of each tube 32 and 34 has an outwardly projecting flared end 36 and receives an externally threaded or male flare nut 38.

Referring to FIGS. 3 & 5, the inner or opposite end portion of each metal tube 32 and 34 has a mechanically deformed or forged end portion 42 (FIG. 5) which is forged or swaged radially inwardly to provide the end portion with an outside diameter of about 0.133" and an inside diameter of about 0.063". The tube end portion 42 is also provided with a series of axially spaced cylindrical lands or ridges 44 each of which extends from a sharp radial shoulder 46 to provide the end portion 42 with an axial cross sectional configuration similar to a conventional eyelet which is machined as an integral part of a conventional brass fitting or is pressed into a brass fitting and brazed, as mentioned above. The forged or reduced end portion 42 of each steel tube 32 and 34 slides snugly into an end portion of the high pressure hose 30, and the end portion of the hose is clamped to the end portion 42 of the metal tube 32 or 34 by an annular metal or brass or stainless steel sleeve or collar 50. The collar 50 surrounds the end portion of the hose and is squeezed inwardly by either a single crimp 51 (FIG. 2) or a dual crimp 51 (FIGS. 3 & 4) or other crimps performed by a conventional crimping machine.

The collar 50 has an end portion or wall 52 with a center bore or hole 53 slightly larger than the outer diameter of the steel tubes 32 and 34 so that the collar 50 slides onto the tube during assembly. As shown in FIGS. 3 & 5, the end portion 42 of each tube 32 and 34 is formed or forged with an outwardly projecting circumferential rib 56 which is engaged by the end wall 52 of the collar 50. The rib 56 also engages and forms a stop for the adjacent end surface of the flexible hose 30. Thus after the metal collar 50 is crimped radially inwardly to compress the end portion of the hose against the ribbed end portion 42 of the steel tube, the end wall 52 of the collar 50 and the adjacent rib 56 cooperate to provide the connection with a substantial tensile strength, for example, over 400 pounds. The end wall 52 also protects the adjacent end of the tube.

Referring to FIG. 4, the opposite end portion of each metal tube 34 having a flared end 36, is coupled or secured to the housing or body of the corresponding caliper 16 by the corresponding externally threaded flare nut 38 which is threaded into an internally threaded port within the caliper body. Preferably, the caliper body port is machined with a tapered or conical seat 58 which surrounds a hydraulic fluid passage 61 within the caliper body and receives the flared end 36 of the tube 32 to form a high pressure fluid-tight seal when the flare nut 38 is tightened. The opposite end of each metal tube 32 is secured to the ABS brake control valve 22 by the corresponding externally threaded flare nut 38 and an internally threaded bore with a seat 58.

Referring to FIGS. 6–9, the deformed or forged end portion 42 on each of the steel tubes 32 and 34 is produced by forming or forging tooling 70 which includes a series of circular die sets 71, 72, 73 & 74 confined within a surrounding housing 78 having a tapered or part conical cam surface 81 extending from a cylindrical surface 82. The stack of die sets 71–74 are confined between a set of axially spaced cylindrical plates 83 and 84 which are tied together by a set of four shouldered screws 87. The screws 87 extend through corresponding aligned slots 89 within the die sets 71–74 and provide for radial sliding movement of the die sets. A set of axially extending guide pins 92 also connect the plates 83 and 84 and extend through corresponding slots 94 within the die sets.

As shown in FIGS. 8 & 9, each of the die sets 71–74 includes four ¼ circular segments such as the four segments 96 for the die set 74. The ¼ segments of each die set are held in alignment by a set of guide pins 98 which slide within corresponding holes or bores 101 within the die segments so that the die segments may move radially between retracted positions (FIG. 6) and inward forging positions (FIG. 7). As shown in FIGS. 6 and 7, each of the die sets 71–74 has center bore surfaces which together correspond to the outer contour of the deformed or forged end portion 42 of the steel tubes 32 and 34 and include recesses or cavities which form the ridges 44 and shoulders 46 as well as the circumferential rib 56 when the die sets are cammed radially inwardly by the surface 81.

Each of the die sets 71–74 has a peripheral tapered surface 104 which has the same slight taper as the tapered surface 81 within the housing or body 78. The plate 83 supports an axially extending center pin or mandrel 106 which has a diameter corresponding to the desired inside diameter of the forged end portion 42 of each of the tubes 32 and 34, for example, a diameter of 0.063". The mandrel 106 has a cylindrical head portion 108 which is supported within a bore 110 formed within the center of the die plate 83. A set of four screws 112 (FIG. 6) secure the cylindrical die plate 83 to an annular plate 114 which is secured by a circumferential weld 116 to a piston rod 118 extending from a double acting hydraulic cylinder (not shown). The rod 118 has a center bore 121 which aligns with the bore 110 within the die plate 83 and confines a pin 123 for retaining the mandrel 106 within the die plate 83, as shown in FIGS. 6 and 7.

In operation of the forging or forming tooling 70, the piston rod 118 is extended within the housing 78 to the position shown in FIG. 6 where the sections 96 of the die sets 71–74 are retracted radially outwardly by springs (not shown) for freely receiving an end portion of a metal tube 32 or 34 which slides onto the mandrel 106. When the piston rod 118 and die sets 71–74 and steel tube are retracted by the hydraulic cylinder to the position shown in FIG. 7, the sections 96 of the die sets 71–74 are cammed radially inwardly by the cam surface 81 so that the die sets deform or forge the inner and outer configuration of the end portion 42 including the axially spaced ridges 44, the radial shoulders 46 and the stop rib 56. When the piston rod 118 is extended again, the segments 96 of the die sets 71–74 retract radially outwardly so that the end portion 42 of the tube may be withdrawn from the mandrel 106 and the die sets of the tooling 70. It is to be understood that the forging tooling shown in FIGS. 6–9 represents one form of tooling for quickly producing the forged end portions 42 on the steel pipes or tubes 32 and 34. However, the deformed or forged end portion 42 may also be formed by other means such as a roll-forming operation similar to the tooling used for roll-forming threads onto a bolt.

FIG. 10 shows a modification of a brake line assembly similar to that described above in connection with FIG. 3 and wherein the same components have the same reference numbers, and the modified components are identified with a prime mark or a new reference number. Each of the metal or steel tubes 32' and 34' have a forged or reduced end portion 42' which extends from a forged or reduced cylindrical neck portion 126 having an outside diameter slightly less than the outside diameter of the tube 32' or 34' and slightly greater than the outside diameter of the end portion 42' to form annular tapered shoulders 128 and 131. A metal or brass collar 50' includes one or more crimps 51' on the hose 30 and also includes an end portion 134 having a stepped center bore which slidably receives the tube and the neck portion 126. The collar portion 134 engages the shoulder 128 to form a stop for the tube when the end portion 42' and neck portion 126 are inserted into the collar 50'. After the end portion 42' and neck portion 126 are inserted into the center bore of the collar 50' and before the collar 50' receives the corresponding end portion of the hose 30, an annular spring steel retaining washer 136 is pressed onto the neck portion 126 of the tube 32' or 34' so that the collar 50' is secured or locked onto the tube. The end portion of the hose 30 is then inserted into the collar 50', and the collar 50' is crimped with one or two crimp portions 51' or other forms of crimps.

Referring to FIGS. 11–13, another embodiment of a flexible hydraulic brake line assembly 140 is constructed in accordance with the invention and includes a metal or brass fitting or collar 142 for positively connecting the flexible hose 30 to a steel pipe or tube 144 which has substantially the same outside diameter and inside diameter as the tubes 32 and 34, but is also coated with a thin plastic or nylon protective coating or layer 146. The tube 144 has an inwardly forged reduced end portion 148 which has the same size and configuration as the end portion 42 described above in connection with FIG. 5 and is formed with tooling such as described above in connection with FIGS. 6–9. The tube end portion 148 extends from a tapered annular shoulder 151 similar to the shoulder 131 described above in reference to FIG. 10.

The metal fitting or collar 142 includes a tubular portion 154 which surrounds the end portion 148 of the tube 144 and has internal grooves 156 formed by forming internal helical threads. The collar 142 also has an annular hub or end portion 158 having an external mounting groove 161 and an internal center bore 162 for receiving the metal tube 144 with the outer plastic coating or layer 146. If desired, the plastic coating or layer 146 may be terminated at the end of the collar end portion 158 and not extend into the center bore 162. Also, a spring gripping retaining washer or push nut 136 may be mounted on the tube 144 or end portion 148 after the collar 142 is slid upon the steel tube 144.

After the end portion of a flexible hose 30 is pushed onto the end portion 148 of the tube 144 and into the tubular portion 154 of the collar 142, the collar 142 is positioned within modified conventional crimping tooling which swages or crimps the tubular portion 154 inwardly, as shown in FIGS. 11 & 13, to force the flexible hose 30 into the external grooves within the end portion 148 and the internal grooves 156 within the tubular portion 154 for positively securing the end portion 148 of the tube 144 and the tubular portion 154 of the collar 142 to the end portion of the hose 30. As shown in FIG. 11, the crimping operation produces peripherally spaced and axially extending flat crimp surfaces 166.

Simultaneously with the crimping operation of the tubular portion 154 of the collar 142, forming the crimp surfaces 166, the modified crimping tooling also crimps the hub or end portion 158 of the collar 142 to a position where the end portion 158 deforms the steel tube 144 to form a reduced neck portion 171 (FIG. 13) having an inside diameter substantially the same as the inside diameter of the forged end portion 148 of the tube 144. This crimping operation of the collar end portion 158 is effective to lock or positively secure the collar 142 to the metal tube 144 and provides the assembly 140 with substantial tensile strength. As shown in FIG. 11, the inward squeezing or crimping operation of the collar end portion 158 also produces circumferentially spaced and axially extending flat crimp surfaces 174 on the collar end portion 158, and the surfaces 174 are axially aligned with the surfaces 166 on the crimped tubular portion 154. The reduced neck portion 171 of the tube 144 may also be preformed when the end portion 148 is formed using tooling such as shown in FIGS. 6–9.

Referring to FIG. 14, an assembly 140 of a steel tube 144, collar 142 and flexible hose 30 are enclosed or encapsulated in a molded body 180 of a semi-rigid and slightly resilient plastics or rubber material to provide protection for the assembly 140. With such encapsulation, the fitting or collar 142 may be formed of cold rolled steel or metal instead of brass. The body 180 may be injection molded after the assembly 140 is placed as an insert in the mold, and preferably, the body 180 is molded with a mounting portion or flange 182 having a hole 183 to facilitate attaching of the assembly to a component of a motor vehicle. Accordingly, the molded encapsulating body 180 may have any configuration. As shown in FIG. 15, two encapsulating bodies 190 may be molded as one piece or unit with a connecting portion or arcuate web 192 for encapsulating a plurality or two of the assemblies 140. Dual molded assemblies simplify or facilitate mounting of the assemblies onto a motor vehicle component, for example, with a band clamp 194. In some motor vehicles, two hydraulic brake line assemblies are required for the braking system for each vehicle wheel, and the combined encapsulating bodies 190 not only protect the two assemblies 140, but also simplify attaching the assemblies to motor vehicle components adjacent each wheel.

FIG. 16 illustrates another modification or embodiment of a brake line assembly 200 constructed in accordance with the invention and wherein a metal fitting or collar 204 positively connects the end portion of a flexible brake line hose 30 to a metal or steel pipe or tube 206 having the same inside and outside diameters as the tubes 32, 34 and 144 and a protective plastic or nylon coating or layer 207. The fitting or collar 204 has a tubular portion 210 which is crimped inwardly against the end portion of the hose in the same manner as the tubular portion 154 of the collar 142 is crimped to secure the end portion of the hose 30 to the tubular portion 210 of the collar 204 and to a steel tube end portion 212 having the same configuration as the tube end portion 42 and 148. In the embodiment of FIG. 16, the fitting or collar 204 has an annular hub or end portion 214 with an internal bore having threads 216 which mates with external threads formed on a tubular portion 218 of the metal pipe or tube 206. This assembly forms a connection or coupling between the collar 204 and the tube 206 with also very high tensile strength. After the collar 204 is threaded onto the tubular portion 218 of the tube 206, the end portion of the hose 30 is inserted onto the tubular end portion 212 of the tube 206 and within the tubular portion 210 of the collar 204, after which the tubular portion 210 is crimped inwardly, as mentioned above.

From the drawings and the above description, it is apparent that a hydraulic brake line assembly constructed in accordance with the present invention, provides desirable features and advantages. For example, one important feature is provided by the simplicity of a brake line assembly of the invention which eliminates expensive brass fittings, such as a fitting with a machined "banjo" block having an integral or pressed in ribbed eyelet, eliminates brazing of the fittings and thereby eliminates any plating operations required after brazing. A brake line assembly constructed in accordance with the invention also provides for high tensile strength between the metal tube and the flexible hose, and permits the use of seamless stainless steel bendable tubing to form the tubes, which is sometimes highly desirable to eliminate or minimize corrosion.

The brake line assembly of the invention further substantially reduces the equipment for producing brake line assemblies and permits the use of one torque wrench for tightening all of the externally threaded flare nuts 38 into the brake calipers or brake cylinders as well as into a supply component such as the ABS brake control valve 22. Moreover, the brake line assemblies minimize the paths for possible leaks and may be easily checked or tested with high pressure fluid or vacuum prior to shipment to a vehicle assembly plant. The brake line assemblies, with the metal tubes preformed on a CNC programmable tube bender, and for use on one automobile or vehicle, may also be assembled or tied together to facilitate shipment and for rapid and convenient handling and installation onto a vehicle on an assembly line. The encapsulation of a tube and hose assembly with a molded plastic body having a mounting portion, as shown in FIGS. 14 & 15, not only protects the assembly but simplifies mounting of the assembly on a vehicle body. As a result of the above advantages, the brake line assembly of the invention provides not only for a higher quality assembly with high tensile strength, but also a substantial total cost savings over conventional brake line assemblies commonly installed on motor vehicles.

While the methods and forms of brake line assembly and the forging tooling herein described constitute preferred embodiments of the invention, it is to be understood that the invention is not limited to the precise methods, tooling and assemblies described, and that changes may be made therein without departing from the scope and spirit of the invention as defined in the appended claims.

What is claimed is:

1. A flexible hydraulic brake line assembly for use on a motor vehicle, comprising an elongated multi-layer high pressure flexible brake hose having a predetermined inner diameter and opposite end portions, an elongated bendable metal tube having a predetermined outer diameter greater than said inner diameter of said hose, said metal tube having an inwardly forged and reduced integral end portion having a diameter generally the same as said inner diameter of said hose, said end portion of said metal tube extending into said end portion of said hose, an annular metal collar having a tubular portion crimped radially inwardly against said end portion of said hose and positively compressing said end portion of said hose against said end portion of said tube, and said collar having an opposite end portion threadably connected to said metal tube to lock said collar to said tube.

2. An assembly as defined in claim 1 wherein said metal tube has an opposite end portion with an outwardly projecting flare, and an externally threaded tubular flare nut surrounding said opposite end portion of said tube.

3. An assembly as defined in claim 2 in combination with a hydraulic brake actuator having an internally threaded hole receiving said flare nut and connected to a hydraulic fluid passage within said actuator, and said actuator has an end surface surrounding said passage at an inner end of said hole and engaging said flare on said opposite end portion of said tube.

4. An assembly as defined in claim 1 wherein said crimped tubular portion of said collar has internal grooves receiving said end portion of said hose.

5. An assembly as defined in claim 1 wherein said reduced end portion of said tube has outwardly projecting and axially spaced ridges engaging said end portion of said hose.

6. A flexible hydraulic brake line assembly for use on a motor vehicle, comprising an elongated multi-layer high pressure flexible brake hose having a normally uniform inner diameter, an elongated bendable metal tube having a normally uniform outer diameter greater than said inner diameter of said hose, said metal tube having an inwardly forged and reduced integral end portion with an outer diameter generally the same as said inner diameter of said hose, said integral and reduced end portion of said metal tube extending into an end portion of said hose, an annular one-piece metal collar having a tubular end portion crimped radially inwardly against said end portion of said hose and positively compressing said end portion of said hose against said end portion of said tube, and said one-piece collar having an integral opposite end portion smaller than said tubular end portion and crimped radially inwardly against a reduced neck portion of said tube to lock said one-piece collar directly to said tube.

7. An assembly as defined in claim 6 wherein said tube includes a plastic coating extending into said collar and surrounding said reduced neck portion of said tube.

8. An assembly as defined in claim 6 and including a one-piece molded plastic body having a length longer than a corresponding length of said collar, said body encapsulating said collar and said end portions of said hose and said tube projecting from said collar, and said body having a vehicle mounting portion.

9. A flexible hydraulic brake line assembly for use on a motor vehicle, comprising an elongated multi-layer high pressure flexible brake hose having a normally uniform inner diameter, an elongated bendable metal tube having a normally uniform outer diameter greater than said inner diameter of said hose, said metal tube having an inwardly forged and reduced integral end portion having an outer diameter generally the same as said inner diameter of said hose, said reduced integral end portion of said metal tube extending into an end portion of said hose, an annular one-piece metal collar having a tubular end portion crimped radially inwardly against said end portion of said hose and positively compressing said end portion of said hose against said end portion of said tube, said collar having an opposite end portion secured to said metal tube, and a one-piece molded plastic body having a length longer than a corresponding length of said collar and encapsulating said collar and said end portions of said hose and said tube projecting from said collar.

10. An assembly as defined in claim 7 wherein said opposite end portion of said one-piece collar is crimped to a reduced neck portion of said tube for locking said one-piece collar directly to said tube and to provide said assembly with substantial tensile strength.

11. An assembly as defined in claim 9 wherein said plastic body includes a vehicle mounting portion for supporting said assembly.

12. An assembly as defined in claim 9 wherein said opposite end portion of said collar is threadably connected to said metal tube for securing said collar to said tube and to provide said assembly with substantial tensile strength.

13. An assembly as defined in claim 6 in combination with a hydraulic brake actuator having an internally threaded hole connected to a hydraulic fluid passage within said actuator, said metal tube having an opposite end portion with an outwardly projecting flare, an externally threaded tubular flare nut surrounding said opposite end portion of said tube and threaded into said hole, and said actuator has an end surface surrounding said passage at an inner end of said hole and opposing said flare on said opposite end portion of said tube.

14. An assembly as defined in claim 6 wherein said crimped tubular portion of said collar has internal grooves receiving said end portion of said hose.

15. An assembly as defined in claim 6 wherein said reduced integral end portion of said tube has outwardly projecting and axially spaced ridges engaging said end portion of said hose.

* * * * *